United States Patent [19]

Hanagan

[11] 4,038,572
[45] July 26, 1977

[54] MAGNETIC CLUTCH DEVICE

[75] Inventor: Michael W. Hanagan, Somers, Conn.

[73] Assignee: Corbin Gentry Inc., Somersville, Conn.

[21] Appl. No.: 673,933

[22] Filed: Apr. 5, 1976

Related U.S. Application Data

[63] Continuation-in-part of Ser. No. 565,747, April 7, 1975, abandoned.

[51] Int. Cl.² .......................................... H02K 37/00
[52] U.S. Cl. ..................................... 310/46; 310/103
[58] Field of Search ............................. 310/46, 103, 80

[56] References Cited

U.S. PATENT DOCUMENTS

| | | | |
|---|---|---|---|
| 3,703,653 | 11/1972 | Tracy et al. | 310/103 X |
| 3,811,058 | 5/1974 | Kiniski | 310/80 |
| 3,879,622 | 4/1975 | Ecklin | 310/80 |
| 3,935,487 | 1/1976 | Czerniak | 310/46 |
| 3,936,683 | 2/1976 | Walker | 310/103 |
| 3,967,146 | 6/1976 | Howard | 310/80 |

Primary Examiner—Donovan F. Duggan

[57] ABSTRACT

A magnetically driven motor comprises a housing, an output shaft, a stationary field, a rotating field, a control cylinder and a control cylinder drive motor. The housing and the three pairs of permanent magnets mounted thereon are considered to together define the stationary field of the subject motor. The rotating field consists of a series of permanent magnets at least equal in number to the number of pairs of permanent magnets of the stationary field mounted on the output shaft so as to bear preestablished angular relationships relative to each other and so as to be alignable with the pairs of permanent magnets of the stationary field. The control cylinder consists of a metal cylinder of lesser diameter than the housing of the motor and is supported on the output shaft for relative rotation intermediate the permanent magnets of the stationary field and the permanent magnets of the rotating field. The control cylinder drive motor is supported within the housing of the subject motor and is operatively connected to the control cylinder whereby the rotation of the latter is effected from the former and is independent of the rotation of the output shaft and the rotating field.

8 Claims, 6 Drawing Figures

MAGNETIC CLUTCH DEVICE

CROSS REFERENCE TO RELATED APPLICATION

This application is a continuation-in-part of my copending application, Ser. No. 565,747, filed Apr. 7, 1975 now abandoned.

BACKGROUND OF THE INVENTION

In recent years there has been evidenced a marked increase in the amount of effort being expended on developing alternate forms of prime movers adapted to be utilized in motor vehicles. Much of the work which has been done here to date has been directed primarily towards perfecting a prime mover which could function as a direct substitute for the conventional internal combustion engine.

It has long been recognized that the overall operating efficiency of the internal combustion engine is relatively low. This is basically the reason why the internal combustion engine is such a notorious source of air pollution. However, it was not until relatively recently, i.e., the last five or six years that serious concern began to be expressed regarding the deleterious impact that pollution from internal combustion engines was having on the environment. In response thereto, steps have been taken towards the pursuit of two fundamental approaches which it is hoped would have the effect of minimizing the damage presently being done to the environment. One of these approaches involves the development of some type of means capable of being cooperatively associated with the present internal combustion engine to eliminate from the exhaust thereof those components which have a harmful effect on the environment. The second approach has been directed towards developing a substantially pollution-free engine which could replace the internal combustion engine as the prime mover in a vehicle. In this connection, some persons have looked upon the rotary engine as one such possible replacement for the internal combustion engine. Another approach which has been studied involves the nonuse of fossil fuel. It is with this latter approach that the subject matter of the present invention is concerned.

The desirability of developing a prime mover for motor vehicles which would not be dependent on fossil fuels for its source of energy has received a greal deal of impetus in the last few years because of the shortage of gasoline which has existed as well as the very high cost of gasoline. Inasmuch as no end to the oil shortage appears to be in sight, and the fact that it can be expected that the price of gasoline will only continue to increase, serious attention is being focused on the possibility of providing means capable of being associated with conventional forms of engines of motor vehicles which would be operable to lessen the amount of gasoline being burned thereby, such as by increasing the amount of mileage capable of being obtained from a given gallon of gasoline. Although such efforts are praise-worthy, the only real solution to the problem of gasoline shortages and the high prices thereof is to reduce the dependency on the use thereof by providing prime movers for motor vehicles which do not receive their energy directly from the combustion of fossil fuels.

In addition to the aforementioned disadvantages which characterize the conventional form of internal combustion engines, another disadvantage thereof is that an internal combustion engine is relatively complex, i.e., includes a relatively large number of moving parts. Since it is well-known that the frequency of malfunctions in a manufactured product varies essentially in direct proportion to the number of moving parts embodied therein, it is readily apparent that the number of hours of trouble-free operation capable of being provided by an internal combustion engine will commonly be less than that capable of being provided by another form of prime mover which embodies fewer moving parts. In this regard, an electrically powered engine which embodies a minimum number of moving parts compares very favorably to the internal combustion engine.

Accordingly it is an object of the present invention to provide a novel and improved prime mover operable for powering a motor vehicle.

It is another object of the present invention to provide such a prime mover for a motor vehicle which does not derive its power from fossil fuel.

A further object of the present invention is to provide such a prime mover for motor vehicles which comprises a magnetic motor.

A still further object of the present invention is to provide such a prime mover for motor vehicles wherein magnetic forces produce the power which is employed to drive the motor vehicle.

Yet another object of the present invention is to provide such a prime mover for motor vehicles is characterized by the ease with which speed regulation is capable of being effected.

Yet still another object of the present invention is to provide such a prime mover for a motor vehicle which is simple in construction, and is capable of being easily embodied in a motor vehicle.

SUMMARY OF THE INVENTION

It has now been found that the foregoing and related objects can be readily attained in a motor which is particularly suited for employment as a prime mover and more specifically the primer mover of an electrically powered motor vehicle. The subject motor includes a stationary field, a rotating field, a control cylinder and a control cylinder drive motor. The stationary field comprises a multiplicity of permanent magnets suitably supported on the inner circumference of a stationary cylindrical member. The aforesaid multiplicity of permanent magnets are suitably arranged so as to be located in staggered relation to each other. The rotating field like the stationary field also includes a plurality of permanent magnets. However, the latter plurality of permanent magnets are suitably supported on the output shaft of the subject motor so as to be rotatable therewith. Moreover, the plurality of permanent magnets on the output shaft are suitably arranged relative to each other so as to be alignable with the multiplicity of permanent magnets of the stationary field. The control cylinder consists of a cylindrical member which is supported on the output shaft so asto be rotatable relative thereto. In addition, the control cylinder is suitably supported within the subject motor so as to be interposed between the multiplicity of permanent magnets of the stationary field and the plurality of permanent magnets of the rotating field. The control cylinder has at least one slot or port formed therein so as to be alignable with the permanent magnets of the stationary field and the permanent magnets of the rotating field whereby when the aforesaid slot is aligned with the latter referenced permanent magnets maximum magnetic attraction occurs between the latter. The control cylinder drive motor is suitably supported within the subject motor and is operatively connected to the control cylinder whereby the rotation of the latter is effected from the former and is independent of the rotation of the output shaft and the rotating field.

In accord with the preferred embodiment of the invention, the motor includes a metal housing comprising the stationary cylindrical member to which the multiplicity of permanent magnets of the stationary field are secured. There is also provided a pair of end bells which are suitably attached to the otherwise open ends of the metal housing. The pair of end bells in addition to serving as closures for the open ends of the metal housing, also function as a support for the opposite ends of the output shaft of the motor. The stationary field consists of three pairs of permanent magnets which are secured to the inner circumference of the metal housing so as to be staggered axially relative to each other. Moreover, the three pairs of permanent magnets are arranged on the inner circumference of the metal housing so that they bear different angular relationships to each other. For purposes of describing the motor constructed in accord with the present invention, the metal housing consisting of the stationary cylindrical member with the pair of end bells attached thereto and the three pairs of permanent magnets when taken together can be considered as comprising the stationary field. The rotating field also includes three pairs of permanent magnets which are secured to the other circumference of the output shaft so as to be staggered axially along the length thereof whereby the spacing therebetween corresponds to the spacing between the axially spaced three pairs of permanent magnets of the stationary field so that each of the three pairs of permanent magnets of the rotating field are alignable with a corresponding pair of the three pairs of permanent magnets of the stationary field. In a manner similar to that described above for the three pairs of permanent magnets of the stationary field, the three pairs of permanent magnets of the rotating field are also suitably arranged on the output shaft so that they bear different angular relationships to each other. and more specifically the same angular relationships to each other that the three pairs of permanent magnets of the stationary field bear one to another. Here also, for purposes of describing the motor constructed in accord with the present invention, the three pairs of permanent magnets of the rotating field when taken together with the output shaft of the motor can be considered as comprising the rotating field of the motor. The control cylinder which consists of a rotatable metal cylindrical member is of lesser diameter than the stationary cylindrical member of the housing so as to be insertable therewith. In addition, the control cylinder has three slots or ports formed therein in suitably spaced relation relative to each other so that each slot or port is alignable with a corresponding pair of the three pairs of permanent magnets of the stationary field and a corresonding pair of the three pairs of permanent magnets of the rotating field. The control cylinder drive motor is suitably mounted on one of the pair of end bells, and is preferably operatively connected to the control cylinder by means of a belt and pully drive whereby to enable the control cylinder to be rotatably driven from the output shaft of the control cylinder drive motor.

DETAILED DESCRIPTION OF THE ILLUSTRATED EMBODIMENT

Figure 1:
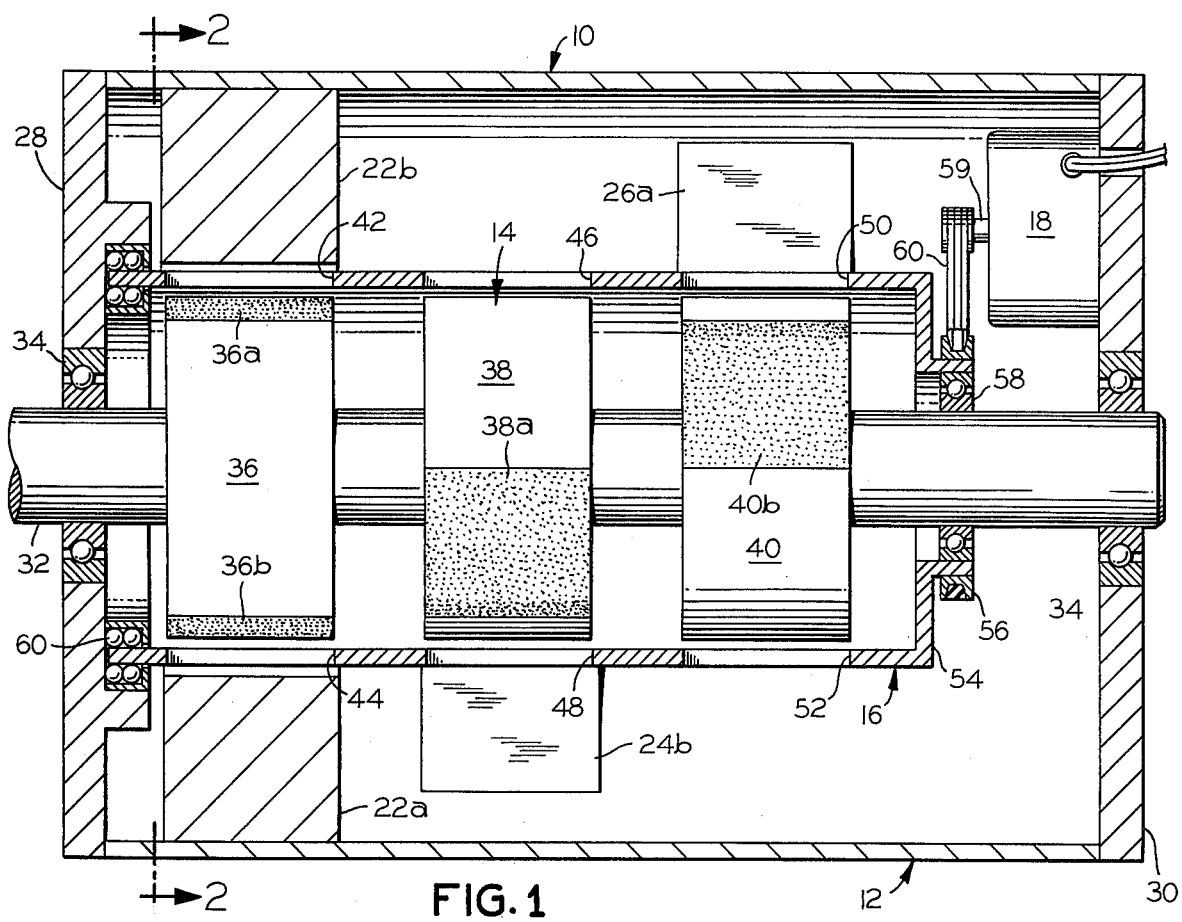
FIG. 1 is a side elevational view partially in section of a magnetic motor suitable for operation as the prime mover of an electrically powered motor vehicle, constructed in accordance with the present invention.
Figure 2:
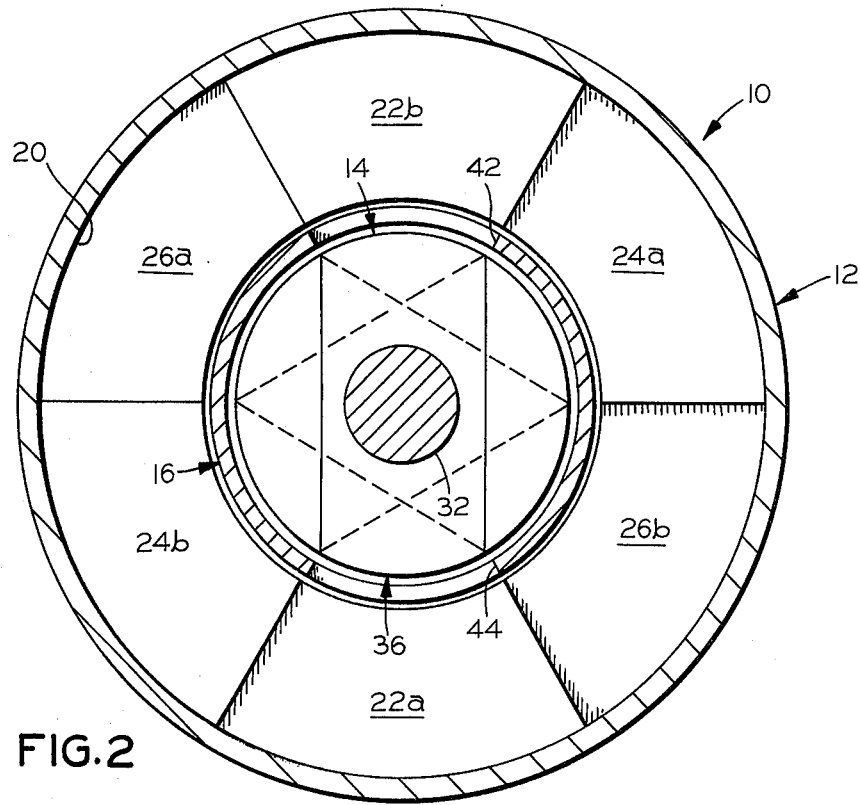
FIG. 2 is an end elevational view of a magnetic motor suitable for operation as the prime mover of an electrically powered motor vehicle, constructed in accordance with the present invention.

Referring now to the drawings and more particularly FIG. 1 thereof, there is illustrated therein a magnetic motor, generally designated by reference numeral 10, constructed in accordance with the present invention which is particularly suited for use as the prime mover in an electrically powered motor vehicle. In accord with the mode of operation of the magnetic motor 10 to which further detailed reference will be had hereinafter, energy from magnetic forces is employed to power the electrically powered motor vehicle. The magnetic motor 10 includes a stationary field 12, a rotating field 14, a control cylinder 16 and a control cylinder drive motor 18.

Figure 3:
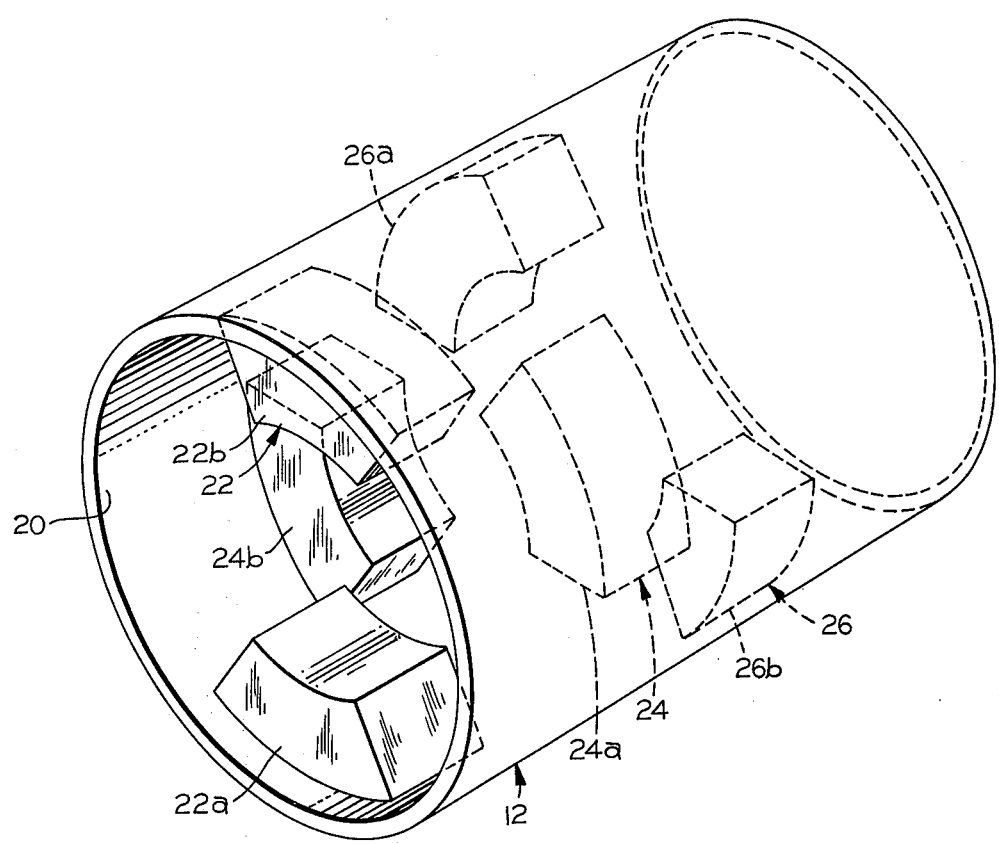
FIG. 3 is a perspective view of the stationary field of a magnetic motor suitable for operation as the prime mover of an electrically powered motor vehicle, constructed in accordance with the present invention.

Turning now to FIGS. 1 and 3 of the drawings, the stationary field 12 as depicted therein includes a stationary cylindrical member 20 which is operative as the housing of the magnetic motor 10. In addition, the stationary field 12 also includes in accord with the preferred embodiment of the invention three pairs of permanent magnets 22, 24 and 26. Each of the latter pairs of permanent magnets 22, 24 and 26 in turn consists of a North pole segment 22a, 24a and 26a, respectively, each having an arcuate-shaped configuration, and a South pole segment 22b, 24b and 26b, respectively, each also having an arcuate-shaped configuration. Moreover, the radius of curvature of the external circumference of each of the North pole segments 22a, 24a and 26a and each of the South pole segments 22b, 24b and 26b is selected so as to conform substantially to the radius of curvature of the inner circumference of the stationary cylindrical member 20. As best understood with reference to FIG. 3 of the drawings, the three pairs of permanent magnets 22, 24 and 26 are secured to the inner circumference of the stationary cylindrical member 20 so as to be located axially along the length of the latter in substantially equally spaced relation to each other, i.e., the spacing between adjacent pairs of the three pairs of permanent magnets 22, 24 and 26 is substantially equal. In addition, as depicted in FIG. 3, the three pairs of permanent magnets 22, 24 and 26 are arranged around the circumference of the stationary cylindrical member 20 so as to bear different angular relationships relative to each other. More specifically, with reference to FIG. 3, as shown therein each of the North pole segments 22a, 24a and 26a is suitably arranged relative to each other so as to in addition to being axially spaced one from another, the segments 22a, 24a and 26a are angularly staggered relative to each other so as to be located substantially 120° apart around the circumference of the stationary cylindrical member 20. Similarly, the South pole segments 22b, 24b and 26b are staggered relative to each other in like manner so that in addition to being axially spaced, they are also positioned substantially 120° apart around the circumference of the stationary cylindrical member 20. By way of illustration and with reference to FIG. 3 of the drawings, if the top of the stationary cylindrical member 20 as it appears in the latter figure is considered to constitute the position of zero degrees around the circumference of the stationary cylindrical member 20, and the bottom of the latter as viewed in FIG. 3 is considered to constitute the position of 180° around the circle which is defined by the circumference of the stationary cylindrical member 20, then the North pole segments 22a, 24a and 26a, and the South pole segments 22b, 24b and 26b are secured to the inner circumference of the stationary cylindrical member 20 so as to bear the following orientation, i.e., angular relationship to the points of the circle defined by the circumference of the member 20. Namely, the South pole segment 22b is located at the position of 0°/360°, the North pole segment 24a is located at the position of 60°, the South pole segment 26b is located at the position of 120°, the North pole segment 22a is located at the position of 180°, the South pole segment 24b is located at the position of 240°, and the North pole segment 26a is located at the position of 300°. Consequently, it should be readily apparent that the corresponding North and South pole segments 22a and 22b, 24a and 24b, and 26a and 26b, respectively, of each of the three pairs of permanent magnets 22, 24 and 26 are located 180° apart around the circumference of the stationary cylindrical member 20. In addition, all of the segments 22a, 24a, 26a, 22b, 24b and 26b of the three pairs of permanent magnets 22, 24 and 26 are arranged in staggered relation relative to each other around the circumference of the stationary cylindrical member 20 so that the segments are each separated one from another by an angle of 60° and so that the North pole segments 22a, 24a and 26a are arranged so as to alternate with the South pole segments 22b, 24b and 26b, i.e., by way of illustration again with reference to FIG. 3, the South pole segment 22b which is positioned at 0° is spaced 60° from the North pole segment 24a which is located at 60° while the North pole segment 24a in turn is spaced 60° from the South pole segment 26b which is located at 120°, etc. Although not depicted in the drawings in the interest of maintaining clarity of illustration therein, it is to be understood that each of the North pole segments 22a, 24a and 26a and each of the South pole segments 22b, 24b and 26b is secured to the interior of the stationary cylindrical member 20 through the use of any suitable conventional form of securing means commonly found employed for this purpose.

Returning again to a consideration of FIG. 1 of the drawings, as depicted therein the stationary cylindrical member 20 which in addition to functioning as a support for the three pairs of permanent magnets 22, 24 and 26 also serves as the housing for the magnetic motor 10. In addition, the stationary cylindrical member 20 is provided at either end thereof with an end bell 28 and 30. The pair of end bells 28 and 30 can be secured to the otherwise open ends of the stationary cylindrical member 20 through the use of any suitable conventional form of attaching means. The pair of end bells 28 and 30 in addition to closing off the ends of the stationary cylindrical member 20 also function as a support for the opposite ends of the output shaft 32. More specifically, the ends of the output shaft 32 are supported in the pair of end bells 28 and 30 so as to permit the output shaft 32 to rotate relative thereto. To this end, in accord with conventional practice, suitable bearing means 34 are preferably mounted substantially at the center of each of the end bells 28 and 30 with the opposite ends of the output shaft 32 being received within a corresponding one of the bearing means 34. A further function performed by the end bell 30 is that of a mount for the control cylinder drive motor 18. In a manner to which further reference will be had hereinafter, the control cylinder drive motor 18 is secured to the inner surface of the end bell 30 so as to be positioned adjacent to but spaced from the control cylinder 16 and in juxtaposed relation to the circumference of the output shaft 32. For purposes of fastening the control cylinder drive motor 18 to the end bell 30, any suitable conventional form of fastening means may be employed, such as for instance a multiplicity of threaded fasteners. The latter referenced fastening means by which the control cylinder drive motor 18 is secured to the end bell 30 has been omitted from the drawings in the interest of maintaining clarity of illustration therein.

Figure 4:
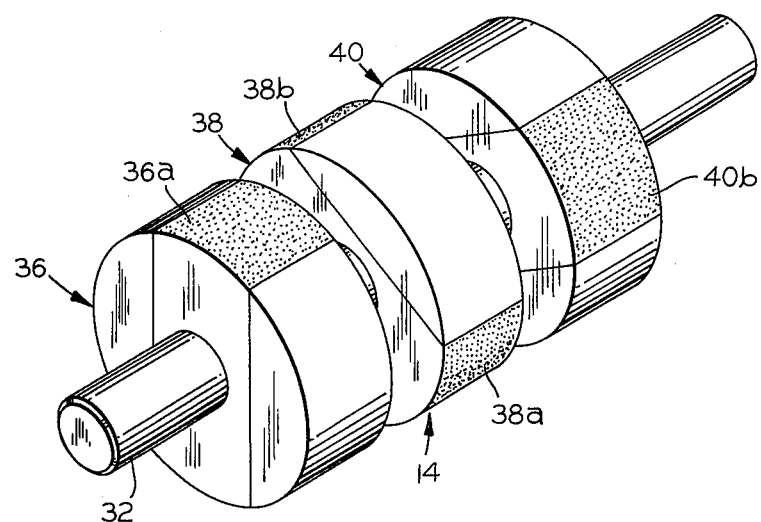
FIG. 4 is a perspective view of the rotating field of a magnetic motor suitable for operation as the prime mover of an electrically powered motor vehicle, constructed in accordance with the present invention.

With reference next to FIG. 4 of the drawings, there is depicted therein the components which when taken together comprise the rotating field 14 of the magnetic motor 10. More specifically, the rotating field 14 includes the output shaft 32 and a plurality of permanent magnets 36, 38 and 40. The latter permanent magnets 36, 38 and 40 are secured on the output shaft 32 intermediate the ends thereof in equally spaced relation relative to each other for rotation with the output shaft 32. For purposes of accomplishing the aforedescribed mounting of the permanent magnets 36, 38 and 40 on the output shaft 32, any conventional form of fastening means commonly found utilized for purposes of securing a member to a shaft for rotation therewith may be employed. Inasmuch as the latter referenced fastening means is of conventional construction, the latter has been omitted from the drawings in the interest of maintaining clarity of illustration therein. Turning now to a more detailed consideration of the nature of the construction of the permanent magnets 36, 38 and 40, in accord with the illustrated embodiment thereof the latter each takes the form of a solid cylinder having embodied therein so as to pass through the center thereof from one side to the other of the cylinder a permanent magnet consisting of a North pole segment formed integrally with a South pole segment. More specifically, each of the three permanent magnets, 36, 38 and 40 includes a North pole segment 36a, 38a and 40a, respectively, and a South pole segment 36b, 38b and 40b, respectively. As will be best understood with reference to FIG. 4, the permanent magnets 36, 38 and 40 are mounted on the output shaft 32 so that they bear different angular relationships relative to each other. More specifically, the permanent magnets 36, 38 and 4 are supported on the output shaft 32 so that they are angularly offset relative to each other by an angle of substantially 120°. Moreover, the permanent magnets 36, 38 and 40 are mounted on the output shaft 32 so that the South pole segment 38b of the permanent magnet 38 is more closely adjacent to the North pole segment 36a of the permanent magnet 36 than to the South pole segment 36b thereof and to the North pole segment 40a of the permanent magnet 40 rather than to the South pole segment 40b therof. Namely, with reference to FIG. 4 of the drawings if the North pole segment 36a of the permanent magnet 36 is assumed to be located therein at a position corresponding to 0° on a circle, then the South pole segment 40b is located at a position corresponding to 60° on the circle, the North pole segment 38a is located at a position corresponding to 120° on the circle, the South pole segment 36a is located at a position corresponding to 180° on the circle, the North pole segment 40a is located at a position corresponding to 240° on the circle, and the South pole segment 38b is located at a position corresponding to 300° on the circle. Finally, it is to be understood as most clearly shown in FIG. 1 of the drawings, that the permanent magnets 36, 38 and 40 are mounted on the output shaft 32 so that when the latter is supported in the bearing means 34 in the manner depicted in FIG. 1, the permanent magnets 36, 38 and 40 of the rotating field 14 are aligned axially with the permanent magnets 22, 24 and 26, respectively, of the stationary field 12.

Figure 5:
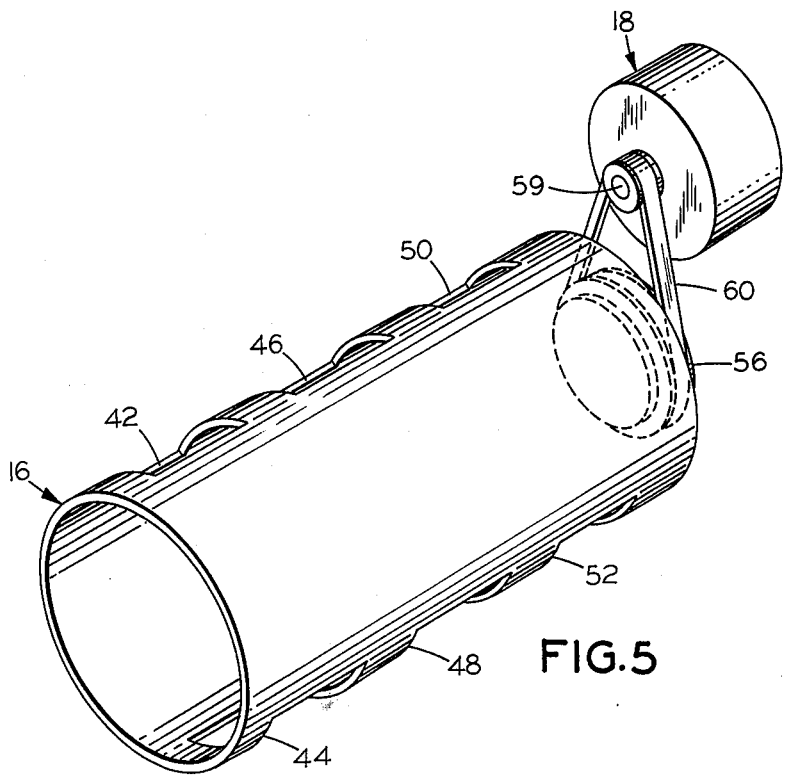
FIG. 5 is a perspective view of the control cylinder and the control cylinder drive motor of a magnetic motor suitable for operation as the prime mover of an electrically powered motor vehicle constructed in accordance with the present invention.

Referring next to FIG. 5 of the drawings, there will now be set forth a description of the nature of the construction of the control cylinder 16 and the control cylinder drive motor 18. Considering first the control cylinder 16, the latter as shown in FIG. 5 consists of a cylindrical member formed of metal. Moreover, the control cylinder 16 is of a lesser length and has a lesser diameter than the housing 20. Namely, the control cylinder 16 is suitably dimensioned so as to be receivable within the housing 20, and more particularly so that the side wall thereof is disposed between the permanent magnets 22, 24 and 26 of the stationary field 12 and the permanent magnets 36, 38 and 40 of the rotating field 14. Continuing with the description of the nature of the construction of the control cylinder 16, the latter in accord with the illustrated embodiment thereof has formed therein three pairs of slots or ports 42 and 44, 46 and 48, and 50 and 52, respectively. More specifically, the aforedescribed ports are suitably arranged relative to each other in the surface of the control cylinder 16 so that each pair of ports, i.e., ports 42 and 44, and ports 46 and 48, and ports 50 and 52, are equally spaced axially relative to each other. In addition, each of the two ports which together form a pair thereof, is formed so that the two ports of each pair thereof are in axial alignment and so that they are spaced substantially 180° apart on the circumference of the control cylinder 16. Finally, as best understood with reference to FIG. 1 of the drawings, the axial spacing between each pair of ports 42 and 44, 46 and 48, and 50 and 52 is selected so as to correspond to the axial spacing between the permanent magnets 22, 24 and 26 of the stationary field 12 and the axial spacing of the permanent magnets 36, 38 and 40 of the rotating field 14 so that when the control cylinder 16 is mounted within the housing 20 in the manner which is depicted in FIG. 1 of the drawings, for a purpose yet to be described the pair of ports 42 and 44 are aligned with the permanent magnet 22 of the stationary field 12 and the permanent magnet 36 of the rotating field 14, and the second pair of ports 46 and 48 are aligned with the permanent magnet 24 of the stationary field 12 and the permanent magnet 38 of the rotating field 14, and the third pair of ports 50 and 52 are aligned with the permanent magnet 26 of the stationary field 12 and the permanent magnet 40 of the rotating field 14. In addition to the structure which has here to date been described as being embodied in the control cylinder 16, the latter as understood with reference to FIGS. 1 and 5 of the drawings is provided with an end wall 54 at one end thereof. The end wall 54 may comprise either a separate member which is suitably secured to one end of the control cylinder 16, or may be formed as an integral part of the control cylinder 16. The end wall 54 has an opening (not shown) formed therein substantially at the center thereof. The latter referenced opening in the end wall 54 is suitably dimensioned so as to permit a hub 56 to be cooperatively associated therewith. More specifically, the hub 56 may either be mounted directly within the aforedescribed opening in the end wall 54 so that a portion thereof projects outwardly of the latter, and so that the hub 56 and the control cylinder 16 are rotatable together as a unit, or the hub 56 may be secured to the external surface of the end wall 54 so that the bore of the hub 56 is aligned with the opening (not shown) in the end wall 54 whereby to permit the output shaft 32 to extend through the center of the control cylinder 16 and through the bore of the hub 56. Moreover, in order to permit the output shaft 32 and the control cylinder 16 to rotate relative to each other, suitable bearing means 58 of a conventional construction are preferably positioned within the interior of the hub 56 so as to be interposed between the inner surface of the bore of the hub 56 and the external circumference of the output shaft 32. In this connection, the other end of the control cylinder 16 as illustrated in FIG. 1 of the drawings is received in suitable bearing means 60 of a conventional nature so as to permit the control cylinder 16 to rotate relative to the housing 20.

Continuing with a description of the subject matter shown in FIG. 5 of the drawings, the control cylinder drive motor 18 comprises an electrical motor of conventional construction. As noted previously hereinabove, the control cylinder drive motor 18 is suitably mounted on the inner surface of the end bell 30 preferably through the use of conventional threaded fasteners (not shown). Moreover, as will be described more fully subsequently in connection with the description of the electrical circuit illustrated in FIG. 6 of the drawings, the control cylinder drive motor 18 is provided with terminal means operable for purposes of connecting the control cylinder drive motor 18 in electrical circuit relation with an external electrical power source. In a conventional manner, the control cylinder drive motor 18 includes an output shaft 59 which is embodied in the former so as to be rotatable relative thereto when the control cylinder drive motor 18 is energized. At least a portion of the output shaft 59 projects outwardly of the control cylinder drive motor 18 so as to be externally accessible for a purpose now to be described. Namely, as shown in FIG. 5 of the drawings, the externally projecting portion of the output shaft 59 is aligned vertically with the externally projecting portion of the hub 56. A suitable belt 60 of conventional construction is passed over the output shaft 59 and the hub 56 whereby the belt 60 functions to operatively connect the hub 56 and more particularly the control cylinder 16 and the output shaft 59 of the control cylinder drive motor 18 whereby the former is driven from the latter. More specifically, through the belt 60 the rotation of the output shaft 59 of the control cylinder drive motor 18 is imparted to the hub 56 of the control cylinder 16 thereby producing rotation of the latter.

There will now be set forth a description of the mode of operation of the magnetic motor 10. For purposes of this description, the slots 42 and 44 in the control cylinder 16 will be referred to as the number one slots, the slots 46 and 48 as the number two slots, and slots 50 and 52 as the number three slots. Moreover, the output shaft 32 will be assumed to be occupying the 0°/360° position thereof, i.e., the position illustrated in FIG. 1 of the drawings. Accordingly, when the output shaft 32 is in the 0°/360° position, the control cylinder 16 is in a position of having the number one slots aligned in such a manner as to allow maximum magnetic attraction of the first sequence stationary and rotating magnets. More specifically, the control cylinder 16 is positioned relative to the housing 20 and the outputshaft 32 so that the slot 42 in the control cylinder 16 is aligned with the North pole segment 36a of the permanent magnet 36 of the rotating field 14 and the South pole segment 22b of the permanent magnet 22 of the stationary field 12, and the slot 44 in the control cylinder 16 is aligned with the South pole segment 36b of the permanent magnet 36 of the rotating field 14 and the North pole segment 22a of the permanent magnet 22 of the stationary field 12. As the control cylinder drive motor 18 proceeds to rotate the control cylinder 16 through the operation of the belt 60, the number one slots, i.e., the slots 42 and 44 move out of alignment and therefore away from the path of maximum magnetic attraction relative to the permanent magnet 22 of the stationary field 12 and the permanent magnet 36 of the rotating field 14. Simultaneously, the number two slots, i.e., the slots 46 and 48 in the control cylinder 16 are being rotated to a position wherein the aforementioned slots are moving towards alignment with the permanent magnet 24 of the stationary field 12 and the permanent magnet 38 of the rotating field 14. Therefore, sequence number two comprising the permanent magnet 24 of the stationary field 12 and the permanent magnet 38 of the rotating field 14 becomes magnetically the strongest and therefore the attraction therebetween is operative to cause the rotation of the output shaft 32 to a second position thereof, i.e., to cause the output shaft 32 to revolve through 120°. As the control cylinder drive motor 18 continues to rotate the control cylinder 16, a condition is being created in which the number one slots, i.e., slots 42 and 44, remain closed, i.e., are nonaligned with the permanent magnet 22 of the stationary field 12 and the permanent magnet 36 of the rotating field 14, the number two slots, i.e., the slots 46 and 48, are moving out of alignment with the permanent magnet 24 of the stationary field 12 and the permanent magnet 38 of the rotating field 14, and the number three slots, i.e., slots 50 and 52 in the control cylinder 16 are moving to an open position, i.e., into alignment with the permanent magnet 26 of the stationary field 12 and the permanent magnet 40 of the rotating field 14 therefore creating a condition wherein the maximum magnetic attraction is between the latter two magnets, i.e., the magnets 26 and 40. Consequently, the output shaft 32 is again caused to rotate through another 120°, i.e., to a third position thereof. The control cylinder drive motor 18 continues to drive the control cylinder 16 causing a condition to occur wherein the number three slots, i.e., the slots 50 and 52 are closing, i.e., are moving out of alignment with the permanent magnet 26 of the stationary field 12 and the permanent magnet 40 of the rotating field 14, and the number one slots, i.e., the slots 42 and 44 are beginning to open, i.e., are once again moving into alignment with the permanent magnet 22 of the stationary field 12 and the permanent magnet 36 of the rotating field 14. When the number one slots open far enough to create the maximum amount of attraction between the stationary permanent magnet 22 and the rotating permanent magnet 36, the output shaft 32 will rotate yet another 120°, i.e., back to the first position thereof corresponding to the 0°/360° position of the output shaft 32 thereby fulfilling one complete revolution of the output shaft 32. It is of course to be understood that the aforedescribed rotation of the output shaft 32 occurs at a relatively rapid rate in order to provide a usable output at the output end, i.e., the left end as viewed with reference to FIG. 1 of the drawings, of the output shaft 32. Moreover, the latter referenced output from the output shaft 32 is employed for purposes of imparting drive to the wheels of the motor vehicle. To this end, the output shaft 32 is operatively connected in a manner known to those skilled in the art to the power train of the motor vehicle. The aforedescribed operation of the magnetic motor 10 is based on the principle that when a metallic object is placed between two attracting magnets distortion of the lines of flux of the magnetic field occurs which weakens, to a degree, the attracting strength of the two magnets. In this regard, the control cylinder 16 is operative as the aforereferenced metallic object, and as the control cylinder 16 is caused to rotate whereby the slots 42, 44, 46, 48, 50 and 52 therein are rotated into and out of alignment with the stationary permanent magnets 22, 24 and 26 and the rotating permanents magnets 36, 38 and 40 in accord with a predetermined sequenced operation, a weakening and strengthening of the magnetic attraction occurs alternately between the stationary permanent magnet 22 and the rotating permanent magnet 36, the stationary permanent magnet 24 and the rotating permanent magnet 38, and the stationary permanent magnet 26 and the rotating permanent magnet 40.

Figure 6:
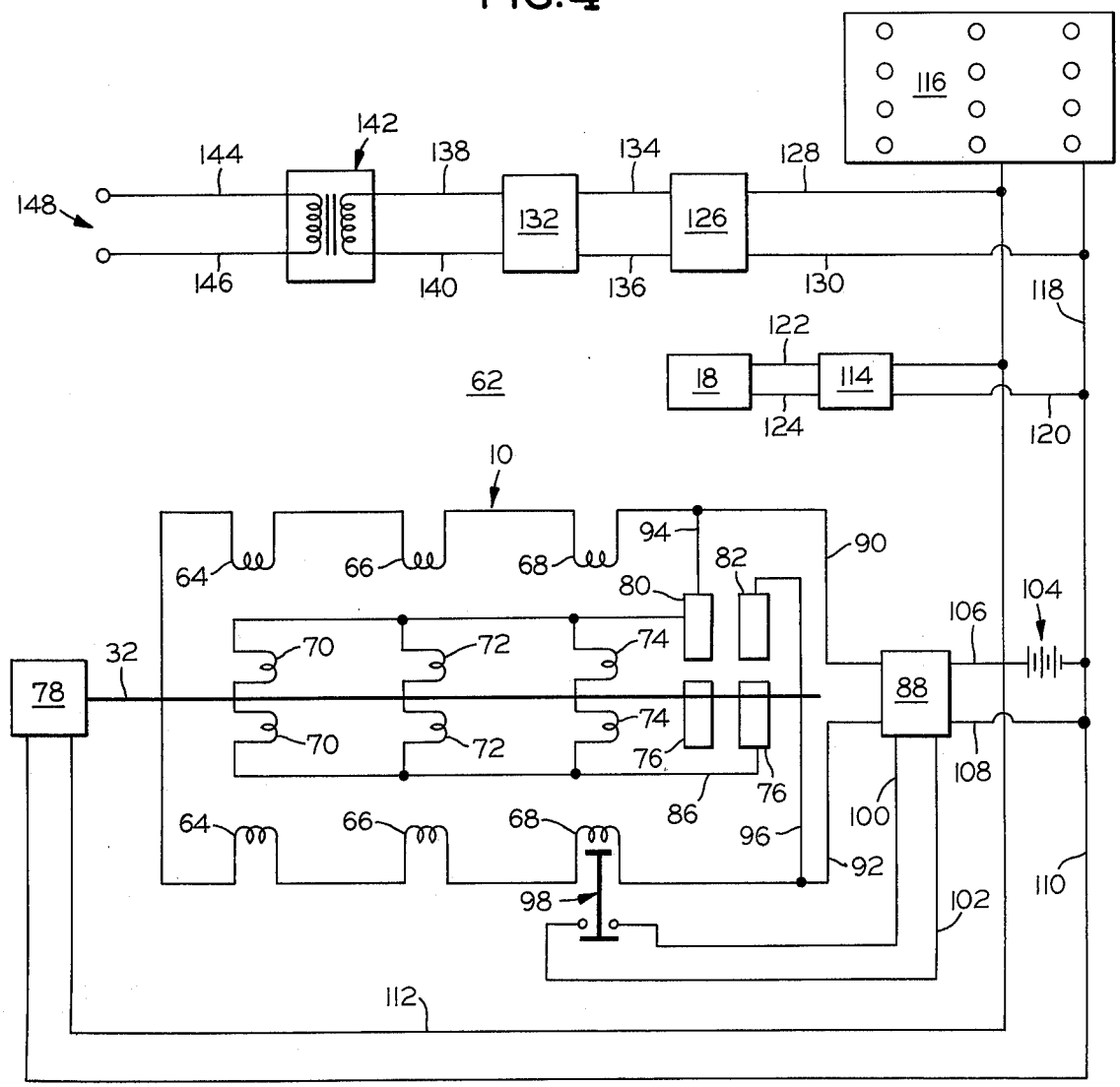
FIG. 6 is a schematic diagram of an electrical control circuit for an electrically powered motor vehicle embodying a magnetic motor constructed in accordance with the present invention.

Turning now to FIG. 6 of the drawings and the control circuit illustrated therein, the control cylinder drive motor 18 is powered by a battery 62 which has a conventional charger 64 connected thereto for periodic recharging thereof. The charger 64 is connected to an external power source (not shown) during the charging operation.

The control cylinder drive motor 18 is energized by closing a switch 66, thereby initiating rotation of the output shaft 32 of the magnetic motor 10 as described hereinbefore. The speed of rotation of the control motor 18 and thus the output shaft 32 is easily controlled by adjusting a variable resistor 68 in series with the battery 62, switch 66, and control motor 18. The switch 66 may conveniently comprise the ignition switch of a vehicle to be powered by the magnetic motor 10 with the variable resistor 68 comprising the throttle.

In addition to the discharge of the battery 62, prolonged use of the magnetic motor 10 will weaken the magnets 22, 24 26, 36, 38, 40, thus requiring periodic replacement or recharging. In view of the present stste of the art, a vehicle powered by the magnetic motor 10 has the capability of traveling up to 20,000 miles before the magnets 22, 24, 26, 36, 38, 40 require replacement or recharging.

In an effort to help preserve the life of the magnets 22, 24, 26, 36, 38 and 40 particularly when the magnetic motor 10 is being utilized as the prime mover for an electrically powered motor vehicle, it is possible to provide the stationary field permanent magnets 22, 24 and 26 with a wire winding that passes therearound, and which is operative to receive electrical current. Therefore, the capability thus exists for establishing therewith an electromagnetic field of the same polarity as the polarity of the permanent magnets 22, 24 and 26 themselves. In addition, the permanent magnets 36, 38 and 40 mounted on the shaft 32 could also be fitted with windings operable for receiving electricity in order to create an electromagnetic field of the same polarity as the permanent magnets 36, 38 and 40, therefore aiding in the preservation of the permanent magnets 36, 38 and 40, i.e., the preservation of the magnetic strength thereof.

Although only one embodiment of a magnetic motor constructed in accordance with the present invention, which is particularly suited for employment as the prime mover for an electrically powered motor vehicle, has been shown in the drawings and described hereinabove, it is nevertheless to be understood that modifications in the construction thereof may be made thereto by those skilled in the art, without departing from the essence of the invention. In this connection, some of the modifications which can be made in the magnetic motor 10 have been alluded to hereinabove while others will become readily apparent to those skilled in the art when exposed to the present description and illustration of the construction of the magnetic motor 10. For instance, although the magnetic motor 10 has been illustrated in the drawings and described hereinabove as involving a three sequence operation, the invention is not intended to be limited to only magnetic motors which embody three sequences, i.e., three pairs of stationary permanent magnets which cooperate with three pairs of rotating permanent magnets. Obviously, a magnetic motor 10 could be provided in accordance with the present invention in which only one sequence, i.e., one pair each of stationary and rotating permanent magnets or an unlimited number of sequences, i.e., unlimited pairs of stationary and rotating permanent magnets are employed. Three sequences have been employed merely as a means of facilitating the description of the magnetic motor 10. In addition, although the magnetic motor 10 has been depicted and described as embodying a single control cylinder 16 which in turn is provided with three pairs of slots or ports which are aligned with each other, the invention is not limited to this arrangement. Rather, it is to be anticipated that different applications in which it is desired to employ the magnetic motor 10 will require variations in the number of control cylinders and variations in porting configurations.

The essential point of the present invention is that a magnetic motor 10 has been provided which utilizes permanent magnet attraction and repulsion to effect rotation of the output shaft of the motor. Namely, there is utilized permanent magnets both on the revolving shaft and in the stationary field, accompanied by the provision of a third member, i.e., a control cylinder, which selects paths of least or maximum magnetic repulsion and attraction.

Thus, it can be seen that the present invention provides a novel and improved prime mover operable for powering a motor vehicle. Moreover, in accord with the present invention a prime mover for a motor vehicle has been provided which does not derive its power from fossil fuel. The prime mover for motor vehicles of the present invention comprises a magnetic motor. Furthermore, in accord with the present invention a prime mover for motor vehicles has been provided wherein magnetic forces produce the power which is employed to drive the motor vehicle. In addition, the prime mover for motor vehicles of the present invention is characterized by the ease with which speed regulation is capable of being effected therewith. Finally, in accord with the present invention a prime mover for motor vehicles has been provided which is simple in construction, and is capable of being easily embodied in a motor vehicle.

Having thus described the invention, I claim:

1. A magnetic motor comprising:
   a. a stationary housing having a generally cylindrical inner configuration including a pair of end bells supported within said housing;
   b. stationary field means supported within said housing;
   c. an output shaft supported by said pair of end bells for rotation relative thereto and in response to the application thereto of magnetic forces;
   d. rotatable field means supported on said output shaft for rotation therewith, said rotatable field means being secured to said output shaft at a position along the length of said output shaft so that said rotatable field means and said stationary field means are in axial alignment;
   e. control means supported within said housing for rotation relative thereto, said control means being rotatable independent of the rotation of said output shaft, said control means being being interposed between said stationary field means and said rotatable field means and having port means formed therein alignable with said stationary field means and said rotatable field means, said control means being rotatable between a first position wherein said port means is aligned with said stationary field means and said rotatable field means so as to enable maximum magnetic attraction to exist therebetween operable for imparting rotation to said output shaft and a second position wherein said port means is nonaligned with said stationary field means and said rotatable field means; and
   f. drive means supported within said housing and operatively connected to said control means for rotating said control means between said first and second positions thereof.

2. The magnetic motor as set forth in claim 1 wherein said stationary field means comprises at least one stationary permanent magnet supported within said housing, said stationary permanent magnet consisting of a North pole segment and a South pole segment affixed to the inner circumference to said housing so as to be positioned in axial alignment relative to each other and so as to be located in space relation substantially 180° apart around the inner circumference of said housing.

3. The magnetic motor as set forth in claim 2 wherein said rotatable field means comprises at least one rotatable permanent magnet including a North pole portion and a South pole portion.

4. The magnetic motor as set forth in claim 3 wherein said control means comprises a control cylinder including a cylindrically-shaped side wall, and said port means comprises at least a pair of ports formed in said side wall of said control cylinder with each of said pair of ports being positioned axially along the length of said control cylinder so as to be aligned axially relative to each other and so as to be located in spaced relation substantially 180° apart around the circumference of said control cylinder, said control cylinder being supported within said housing for rotation relative thereto with said cylindrically-shaped side wall thereof interposed between said stationary permanent magnet and said rotatable permanent magnet with said pair of ports being located so as to be aligned with said rotatable permanent magnet and said stationary permanent magnet.

5. The magnetic motor as set forth in claim 4 wherein said drive means comprises a control cylinder drive motor supported on one of said pair of end bells and having an output shaft projecting outwardly therefrom into juxtaposed relation with a portion of said control cylinder, and means operatively connecting said output shaft of said control cylinder drive motor and said portion of said control cylinder for imparting rotation to said control cylinder in response to the rotation of said output shaft of said control cylinder drive motor.

6. The magnetic motor as set forth in claim 1 wherein said stationary field means comprises three stationary permanent magnets supported within said housing in spaced axial relation to each other, each of said three stationary permanent magnets consisting of a North pole segment and a South pole segment affixed to the inner circumference of said housing so as to be positioned in axial alginment relative to each other and so as to be located in spaced relation substantially 180° apart around the inner circumference of said housing.

7. The magnetic motor as set forth in claim 6 wherein said rotatable field means comprises three rotatable permanent magnets supported on said output shaft in spaced axial relation relative to each other so as to each be alignable with a corresponding one of said three stationary permanent magnets, each of said three rotatable permanent magnets including a North pole portion and a Soutt pole portion.

8. The magnetic motor as set forth in claim 7 wherein said control means comprises a control cylinder including a cylindrically-shaped side wall, and said port means comprises three pairs of ports formed in said control cylinder so as to be located in axially spaced relation to each other along the length of said control cylinder and with each of said pair of each of said three pairs of ports being positioned so as to be aligned axially with the other port of the corresponding pair of ports and so as to be located in spaced relation substantially 180° apart from said other port of the corresponding pair of ports, said three pairs of ports each being alignable with a corresponding one of said three stationary permanent magnets and a corresponding one of said three rotatable permanent magnets wherein as said control cylinder rotates said three pairs of ports are aligned alternately and in sequence with a different one of said three stationary permanent magnets and a different one of said three rotatable permanent magnets so as to enable maximum magnetic attraction to exist alternately and in sequence between said three stationary permanent magnets and said three rotatable permanent magnets operable to produce the rotation of said output shaft as each of said three rotatable permanent magnets is in turn magnetically attracted to a corresponding one of said three stationary permanent magnets.

* * * * *

UNITED STATES PATENT AND TRADEMARK OFFICE
CERTIFICATE OF CORRECTION

PATENT NO. : 4,038,572
DATED : July 26, 1977
INVENTOR(S) : Michael W. Hanagan

It is certified that error appears in the above-identified patent and that said Letters Patent are hereby corrected as shown below:

Claim 1, Column 12, line 18, "supported within said housing;" should read --supported at the ends of said housing;--

Signed and Sealed this

Eleventh Day of April 1978

[SEAL]

Attest:

RUTH C. MASON
Attesting Officer

LUTRELLE F. PARKER
Acting Commissioner of Patents and Trademarks